US009229742B2

(12) United States Patent
Fujita et al.

(10) Patent No.: US 9,229,742 B2
(45) Date of Patent: Jan. 5, 2016

(54) REGISTRATION OF ELECTRONIC DEVICE TO SERVER

(75) Inventors: Takeshi Fujita, Tokyo (JP); Tsutomu Kawai, Tokyo (JP); Keiichi Ogawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 1375 days.

(21) Appl. No.: 12/648,800

(22) Filed: Dec. 29, 2009

(65) Prior Publication Data

US 2010/0180022 A1 Jul. 15, 2010

(30) Foreign Application Priority Data

Jan. 15, 2009 (JP) ................. 2009-007057

(51) Int. Cl.
*H04L 29/06* (2006.01)
*G06F 9/445* (2006.01)

(52) U.S. Cl.
CPC ........ *G06F 9/44505* (2013.01); *H04L 65/1073* (2013.01)

(58) Field of Classification Search
USPC .......................................... 709/219; 705/302
See application file for complete search history.

(56) References Cited

U.S. PATENT DOCUMENTS

| | | | | |
|---|---|---|---|---|
| 6,256,378 B1 * | 7/2001 | Iggulden | ............... | G06F 9/4443 379/102.01 |
| 6,704,401 B2 * | 3/2004 | Piepho | ................ | H04L 12/2856 379/102.03 |
| 6,772,096 B2 * | 8/2004 | Murakami | ......... | G05B 23/0245 700/10 |
| 7,443,824 B1 | 10/2008 | Lipford et al. | | |
| 7,984,489 B2 * | 7/2011 | Matsuzaki | ............... | G06F 21/10 709/200 |
| 8,091,772 B2 * | 1/2012 | Sherman | ................ | G06Q 30/06 235/375 |
| 8,213,404 B2 * | 7/2012 | Wang | ................ | H04L 29/06027 370/349 |
| 2002/0097260 A1 * | 7/2002 | Igata | ..................... | G06F 9/4443 715/738 |
| 2004/0196821 A1 * | 10/2004 | Haddad | ................... | H04L 29/06 370/349 |
| 2005/0075938 A1 * | 4/2005 | Mukai | .................... | G06Q 30/02 705/24 |
| 2006/0218288 A1 * | 9/2006 | Umezawa | ............ | G10H 1/0066 709/228 |
| 2007/0050266 A1 | 3/2007 | Barber et al. | | |
| 2008/0140821 A1 * | 6/2008 | Tada | ......................... | G06F 8/60 709/223 |
| 2008/0196109 A1 * | 8/2008 | Matsuzaki | .............. | G06F 21/10 726/29 |
| 2009/0037590 A1 * | 2/2009 | Jayadevan | ........... | H04L 65/1006 709/228 |
| 2009/0157558 A1 * | 6/2009 | Kamada | ................. | G06Q 20/04 705/76 |
| 2009/0285399 A1 * | 11/2009 | Schneider | ............ | H04L 63/061 380/278 |

FOREIGN PATENT DOCUMENTS

JP 2002-305514 10/2002

\* cited by examiner

*Primary Examiner* — Backhean Tiv
(74) *Attorney, Agent, or Firm* — Hazuki International, LLC

(57) ABSTRACT

When a user management server apparatus transmits session information to a user terminal apparatus operated by a user, and receives the session information from an electronic device via a network, the user management server apparatus registers a correspondence relationship between the user who operates the user terminal apparatus and the electronic device. A temporary registration server apparatus receives the session information from the user terminal apparatus and transmits the session information and address information on the network of the user management server apparatus which should be a transmission destination of the session information to the electronic device.

6 Claims, 6 Drawing Sheets

FIG.7

USER TABLE 21

| USER ID | PASSWORD HASH |
|---|---|
| user1 | ***** |
| user2 | ***** |
| ⋮ | ⋮ |

ELECTRONIC DEVICE TABLE 22

| DEVICE ID | IDENTIFICATION KEY | USER ID |
|---|---|---|
| 0000300001-0001 | ***** | user1 |
| 0000300001-0002 | ***** | user2 |
| 0000300002-0001 | ***** | user2 |
| ⋮ | ⋮ | ⋮ |

FIG.8

DEVICE REGISTRATION REQUEST TABLE 62

| DEVICE ID | REGISTRATION REQUEST USER ID | Expire |
|---|---|---|
| 0000300003-0001 | user1 | 2009/10/24 14:23:00 |
| ⋮ | ⋮ | ⋮ | ns
REGISTRATION OF ELECTRONIC DEVICE TO SERVER

BACKGROUND OF THE INVENTION

1. Field of the Invention

The present invention relates to registration of an electronic device to a server.

2. Description of the Related Art

For example, there is a system in which electronic devices such as an input device and an output device which do not have a network communication function are registered and managed in a server (for example, refer to Japanese Patent Application Laid-Open No. 2002-305514).

In such a system, a terminal apparatus having a network communication function is connected to the electronic device, an ID of the electronic device is obtained from the electronic device and transmitted to the server, and the ID of the electronic device is registered in the server.

SUMMARY OF THE INVENTION

On the other hand, there is electronic device having a network communication function. Such an electronic device having a network communication function can transmit/receive data and receive a control via a network.

When managing such an electronic device by the server, it is preferred that the server and the electronic device can communicate with each other via the network.

When managing such electronic devices by the server, it is expected that the server holds a correspondence relationship between the electronic device and a user, and uses the correspondence relationship for an access control or the like to the electronic device.

When the server holds the correspondence relationship between the electronic device and the user, the electronic device has to be registered to a user management server which manages the user. However, when there are a plurality of user management servers, and each user management server manages different users, it is difficult that the electronic device identifies the user management server of the user using the electronic device from the plurality of user management servers, and it is also difficult to register an appropriate user management server and the electronic device to be able to communicate with each other.

In light of the foregoing, it is desirable to provide an electronic device registration system and an electronic device registration method in which, even when there are a plurality of user management servers, and each user management server manages different users, the electronic device can identify the user management server of the user using the electronic device from the plurality of user management servers, and an appropriate user management server and the electronic device can be registered to be able to communicate with each other, and it is also desirable to provide a user management server apparatus and a temporary registration server apparatus which can be used for the electronic device registration system and the electronic device registration method.

According to an embodiment of the present invention, there is provided an electronic device registration system as described below.

According to an embodiment of the present invention, there is provided an electronic device registration system which includes: a user management server apparatus which transmits session information to a user terminal apparatus and receives user identification information from the user terminal apparatus via a network, and when receiving the session information from an electronic device, registers the received user identification information and the electronic device in a corresponding manner; and a temporary registration server apparatus which receives the session information from the user terminal apparatus, and transmits the session information and address information of the user management server apparatus which should be a transmission destination of the session information to the electronic device.

In this way, even when there are a plurality of user management server apparatuses, and each user management server apparatus manages different users, the electronic device can identify the user management server apparatus of the user using the electronic device from the plurality of user management server apparatuses, so that an appropriate user management server apparatus and the electronic device can be registered to be able to communicate with each other.

In this way, even when a user management server apparatus manages a plurality of users, a user to be associated with the electronic device can be identified.

The user management server apparatus may register the received user identification information and the electronic device in a corresponding manner when the received user identification information corresponds with any one of pieces of user identification information of predetermined one or more user identification information managed by the user management server apparatus.

In this way, it is possible to prevent from erroneously associating an electronic device which should be associated with a user managed by another user management server apparatus.

The temporary registration server apparatus may receive electronic device identification information of the electronic device along with the session information from the user terminal apparatus, and transmit the session information and the address information to the electronic device identified by the received electronic device identification information.

In this way, the electronic device specified from the user terminal apparatus is associated with the user of the user terminal apparatus, so that it is possible to prevent from erroneously associating a different electronic device with the user.

The user management server apparatus may register the user identification information and the electronic device in a corresponding manner when receiving a registration permission notice from the user terminal apparatus after receiving the session information from the electronic device.

In this way, the correspondence relationship is not registered when the registration permission notice is not received, so that it is possible to prevent from erroneously registering a correspondence relationship between a user and an electronic device, or cancel a registration.

According to another embodiment of the present invention, there is provided a user management server apparatus which includes: a session information generation means for generating session information; a transmitting/receiving means for transmitting the session information to an user terminal apparatus and receiving user identification information from the user terminal apparatus, receiving the session information from an electronic device via a network; and a registration means for registering the received user identification information and the electronic device in a corresponding manner into a storage means when the session information is received by the transmitting/receiving means.

In this way, even when there are a plurality of user management server apparatuses, and each user management server apparatus manages different users, the electronic device can identify the user management server apparatus of the user using the electronic device from the plurality of user management server apparatuses, so that an appropriate user management server apparatus and the electronic device can be registered to be able to communicate with each other.

According to another embodiment of the present invention, there is provided a temporary registration server apparatus which includes: a receiving means for receiving session information generated by a user management server apparatus from a user terminal apparatus; and a transmitting means for transmitting the session information and address information of the user management server apparatus which generates the session information to the electronic device.

In this way, by cooperating with the user management server apparatus, even when there are a plurality of user management server apparatuses, and each user management server apparatus manages different users, the electronic device can identify the user management server apparatus of the user using the electronic device from the plurality of user management server apparatuses, so that an appropriate user management server apparatus and the electronic device can be registered to be able to communicate with each other.

According to another embodiment of the present invention, there is provided an electronic device registration method, which includes the steps of: transmitting user identification information from a user terminal apparatus to a user management server apparatus; transmitting session information from the user management server to the user terminal apparatus; transmitting the session information from the user terminal apparatus to a temporary registration server apparatus via a network; transmitting the session information and address information of the user management server apparatus which should be a transmission destination of the session information from the temporary registration server apparatus to an electronic device; transmitting the session information from the electronic device to the user management server apparatus; and registering the electronic device and the user identification information transmitted from the user terminal apparatus to which the session information is transmitted to the user management server apparatus in a corresponding manner when the session information is received by the user management server apparatus.

In this way, even when there are a plurality of user management server apparatuses, and each user management server apparatus manages different users, the electronic device can identify the user management server apparatus of the user using the electronic device from the plurality of user management server apparatuses, so that an appropriate user management server apparatus and the electronic device can be registered to be able to communicate with each other.

According to the embodiment, even when there are a plurality of user management server, and each user management server manages different users, an electronic device can identify the user management server of the user using the electronic device from the plurality of user management server, so that an appropriate user management server and the electronic device can be registered to be able to communicate with each other.

BRIEF DESCRIPTION OF THE DRAWINGS

FIG. 7 is a diagram illustrating a configuration of a user table and an electronic device table in FIG. 2; and FIG. 8 is a diagram illustrating a configuration of a device registration request table in which a temporary registration server apparatus in FIG. 1 includes.

DETAILED DESCRIPTION OF THE EMBODIMENTS

Figure 1:
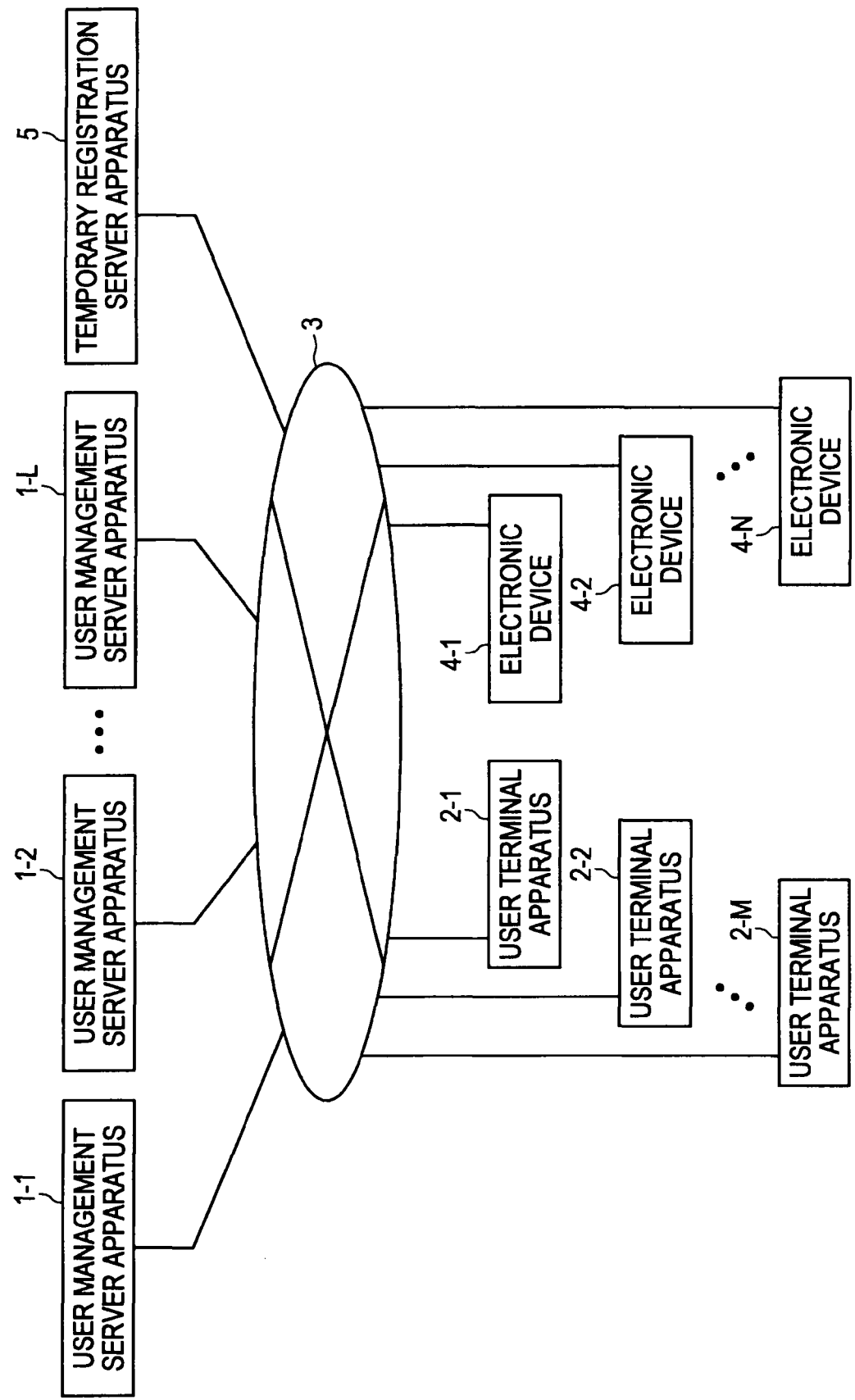
FIG. 1 is a block diagram showing a configuration of an electronic device registration system according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First Embodiment

FIG. 1 is a block diagram showing a configuration of an electronic device registration system according to a first embodiment of the present invention. In this system, each of a plurality of user management server apparatuses 1-1 to 1-L manages one or more users, which are different from each other.

In FIG. 1, a user management server apparatus 1-$i$ ($i$=1, 2, . . . , L, L>1) stores registration information (user ID, password, and the like) of one or more users registered in the user management server apparatus 1-$i$, performs user authentication based on a user's user ID and password transmitted via a network 3 by a user terminal apparatus 2-$j$ operated by the user, and provides various services to an authenticated user. Furthermore, when the user management server apparatus 1-$i$ transmits session information to the user terminal apparatus 2-$j$ operated by a user registered in the user management server apparatus 1-$i$, and receives the session information from an electronic device 4-$k$ via the network 3, the user management server apparatus 1-$i$ registers a correspondence relationship between the user who operates the user terminal apparatus 2-$j$ and the electronic device 4-$k$.

Figure 2:
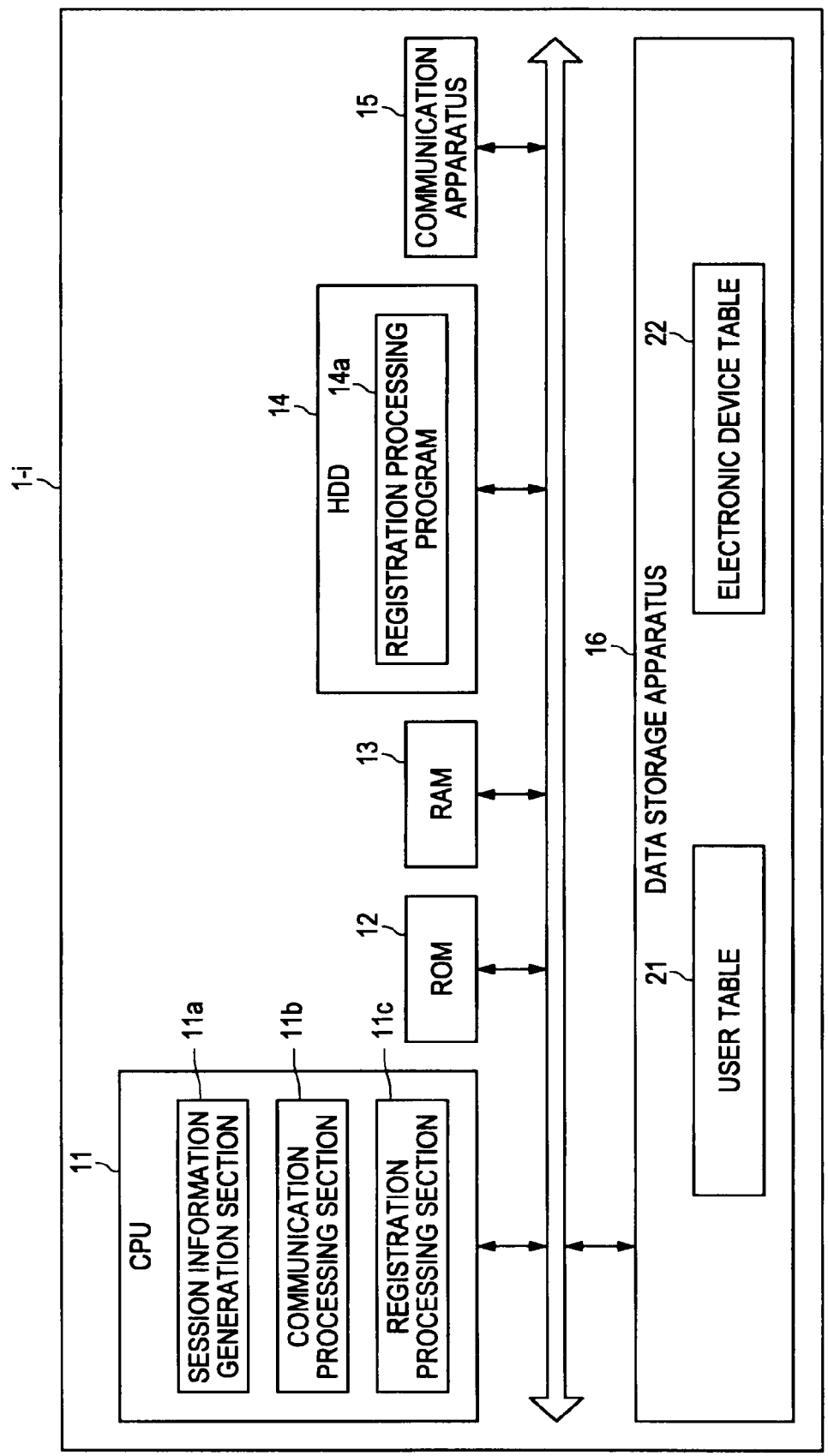
FIG. 2 is a block diagram showing a configuration of a user management server apparatus in FIG. 1.

The user management server apparatus 1-$i$ includes a computer. FIG. 2 is a block diagram showing a configuration of the user management server apparatus 1-$i$ in FIG. 1. In FIG. 2, a CPU 11 is an arithmetic processing unit which executes a program, and performs processing described in the program. A ROM 12 is a non-volatile memory in which program and data are stored in advance. A RAM 13 is a memory in which program and data are temporarily stored when the program is executed. A HDD 14 is a hard disk drive apparatus as a storage medium in which an operating system (not shown in FIG. 2) and a program such as a registration processing program 14$a$ or the like are stored. A communication apparatus 15 is an apparatus which connects to the network 3, and performs data communication with another apparatus via the network 3. As the communication apparatus 15, for example, a network interface card, a modem, or the like are arbitrarily used.

A session information generation section 11$a$, a communication processing section 11$b$, and a registration processing section 11c are realized by executing the registration processing program 14a by the CPU 11. The session information generation section 11a is a processing section which generates session information for each registration session of the electronic device 4-k. The session information generation section 11a is an example of a session information generation means. The communication processing section 11b is a processing section which controls the communication apparatus 15 to transmit the session information to the user terminal apparatus 2-j operated by the user and receive the session information from the electronic device 4-k via the network 3. The communication processing section 11b is an example of a transmitting/receiving means. In the first embodiment, the communication processing section 11b has a function as a HTTP (HyperText Transfer Protocol) server, and can perform data communication using HTTP with another apparatus having a HTTP client function via the network 3. The registration processing section 11c is a processing section which registers the correspondence relationship between the user who operates the user terminal apparatus 2-j identified by the session information and the electronic device 4-k in a data storage apparatus 16 when the session information is received by the communication processing section 11b. The registration processing section 11c is an example of a registration means.

The data storage apparatus 16 is an apparatus which can store a large amount of data, and store a user table 21 including user registration information, and an electronic device table 22 including information of the correspondence relationship between the user registered in the user table and the electronic device 4-k. As such an apparatus, a hard disk drive apparatus, a disk array apparatus, or the like is used.

In the user management server apparatus 1-i, the CPU 11, the ROM 12, the RAM 13, the HDD 14, the communication apparatus 15, and the data storage apparatus 16 are mutually connected by a bus, controller, and the like to be able to communicate with each other.

Next, the user terminal apparatus 2-j (j=1,2, ..., M, M≥1) is a terminal apparatus operated by a user registered in any one of user management server apparatuses 1-i. As the user terminal apparatus 2-j, a mobile phone, a personal computer, and the like are used. Furthermore, in the first embodiment, the user terminal apparatus 2-j performs temporary registration processing in which the user terminal apparatus 2-j receives the session information from the user management server apparatus 1-i and transmits the session information to a temporary registration server 5, and formal registration permission processing in which the user terminal apparatus 2-j transmits a registration permission notice to the user management server apparatus 1-i when registration is permitted by the user after the electronic device 4-k becomes able to be registered in the user management server apparatus 1-i.

Figure 3:
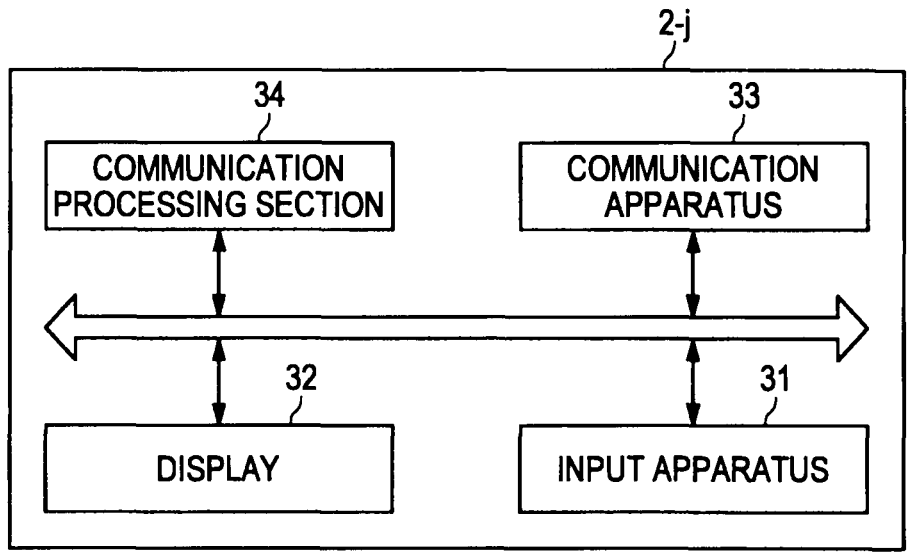
FIG. 3 is a block diagram showing a configuration of a user terminal apparatus in FIG. 1.

FIG. 3 is a block diagram showing a configuration of the user terminal apparatus 2-j in FIG. 1. In FIG. 3, an input apparatus 31 is an apparatus such as a keyboard, a key, and the like which converts a user operation into an electric signal. A display 32 is an output apparatus which outputs various information. A communication apparatus 33 is an apparatus which connects to the network 3, and performs data communication with another apparatus via the network 3. When the user terminal apparatus 2-j is a personal computer, as the communication apparatus 33, for example, a network interface card, a modem, or the like are arbitrarily used. When the user terminal apparatus 2-j is a mobile phone, as the communication apparatus 33, for example, a baseband module or the like is used.

The communication processing section 34 is a processing section which controls the communication apparatus 33 based on a user operation to an input apparatus 31, accesses the user management server apparatus 1-i and the temporary registration server apparatus 5 via the network 3, and transmits/receives various information. The communication processing section 34 is realized by a digital signal processor, a computer, and the like. The communication processing section 34 has an HTTP client function.

The network 3 is a network which properly includes a LAN (Local Area Network), a WAN (Wide Area Network), and the like. As the LAN, an in-house network is considered, and as the WAN, the Internet or the like is considered. The network properly includes a wireless communication path and a wired communication path. The network 3 is an IP (Internet Protocol) network.

The electronic device 4-k (k=1,2, ..., N, N≥1) is an electronic device which has a network communication function, performs data communication with another device via the network 3, and receives a control from another device. The electronic device 4-k is assumed to have a form of computer peripheral or home electric appliance having a network function. Furthermore, in the first embodiment, the electronic device 4-k stores network address information of the temporary registration server apparatus 5 in advance. The electronic device 4-k obtains the session information from the temporary registration server apparatus 5 and the network address information of the user management server apparatus 1-i which manages a user who causes to generate the session information, and performs registration request processing in which the session information is transmitted to the user management server apparatus 1-i identified by the address information.

Figure 4:
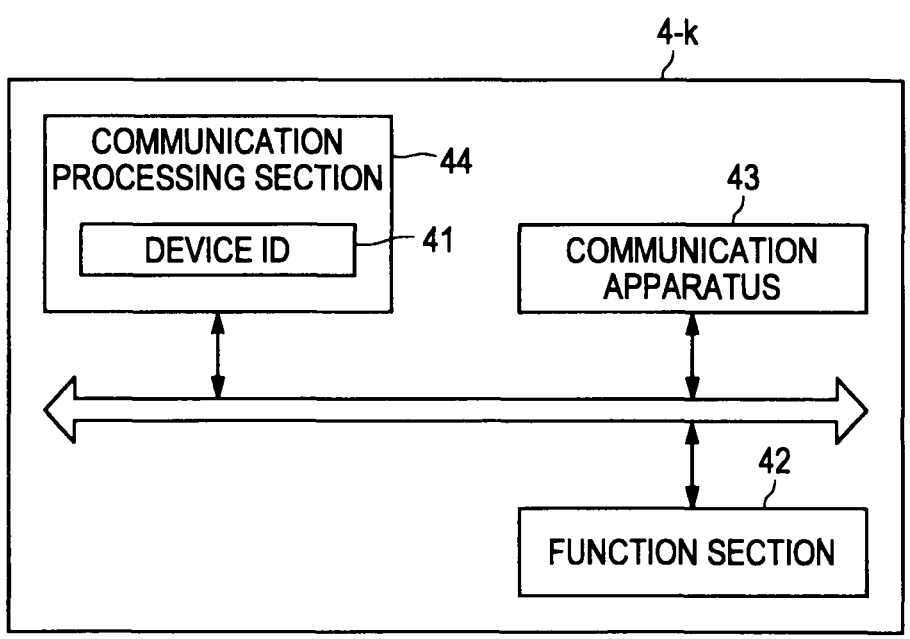
FIG. 4 is a block diagram showing a configuration of an electronic device in FIG. 1.

FIG. 4 is a block diagram showing a configuration of the electronic device 4-k in FIG. 1. In FIG. 4, a device ID 41 is a unique identification information of the electronic device 4-k. The device ID 41 is the information which is stored as data in the electronic device 4-k, or displayed on a housing surface of the electronic device 4-k by printing or the like. Or the device ID 41 may not be included in the electronic device 4-k, and may be written in a user manual or the like of the electronic device 4-k. When being stored as data, the device ID 41 is stored in a non-volatile memory (not shown in FIG. 4) such as a ROM or the like so that the device ID 41 can be read from a communication processing section 44.

The function section 42 is a processing section and/or a mechanical section for realizing the function of the electronic device 4-k. For example, when the electronic device 4-k is a printer, the function section 42 includes a print engine, a printing mechanism, and the like. A communication apparatus 43 is an apparatus which connects to the network 3, and performs data communication with another apparatus via the network 3. As the communication apparatus 43, for example, a network interface card, a modem, or the like are arbitrarily used.

The communication processing section 44 is a processing section which controls the communication apparatus 43, accesses the user management server apparatus 1-i and the temporary registration server apparatus 5 via the network 3, and transmits/receives various information. The communication processing section 44 is realized by a digital signal processor, a computer, and the like. The communication processing section 44 has an HTTP client function.

Next, the temporary registration server apparatus 5 is an apparatus which, when receiving the session information of a registration session, informs the electronic device 4-k to be registered in the registration session of the user management server apparatuses 1-i to be a registration destination. Specifically, the temporary registration server apparatus 5 receives the session information from the user terminal apparatus 2-*j*, and transmits the session information and the address information on the network 3 of the user management server apparatus 1-*i* which should be the transmission destination of the session information to the electronic device 4-*k*. As the address information on the network 3, an IP address, a domain name, a URI (Uniform Resource Identifier), and the like are used.

Figure 5:
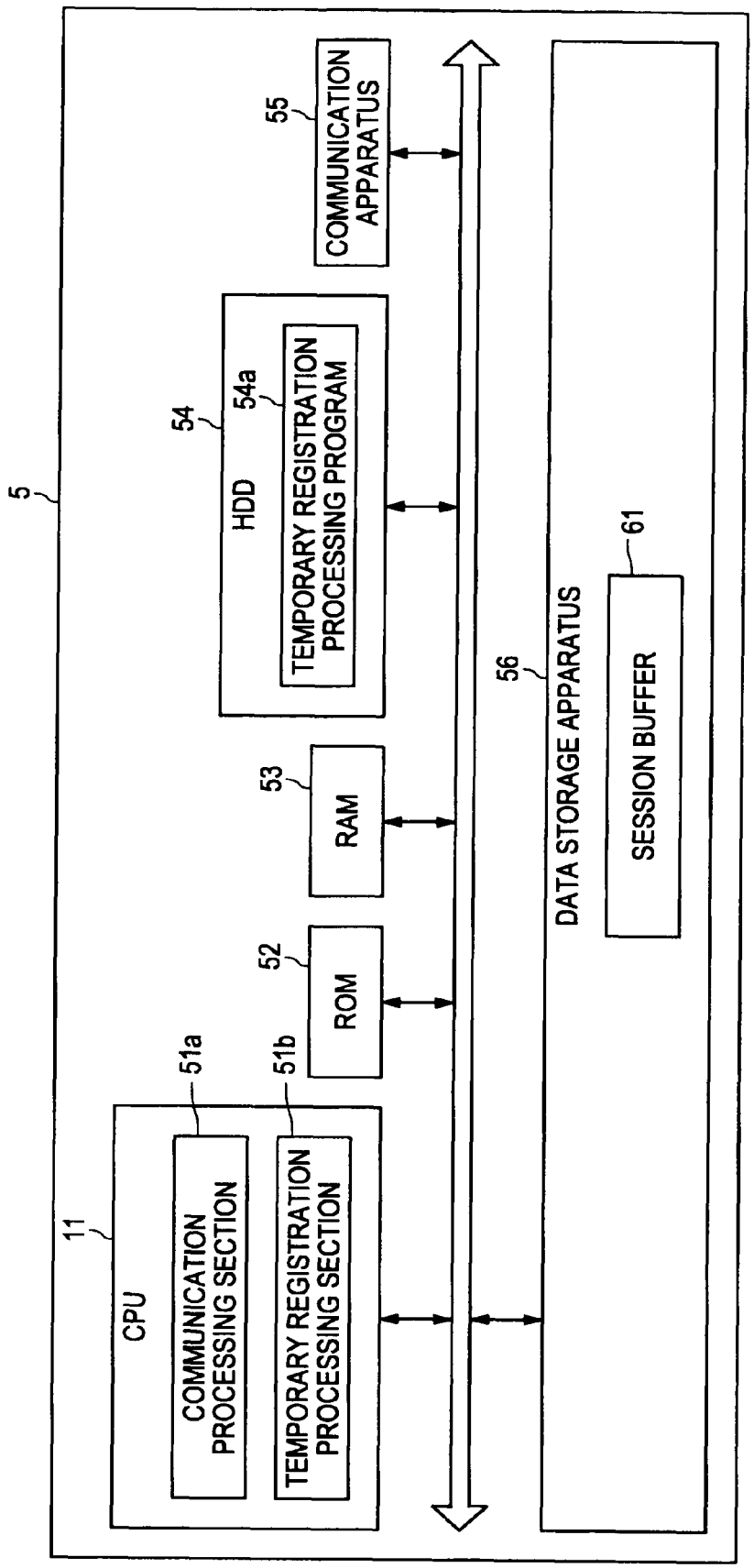
FIG. 5 is a block diagram showing a configuration of a temporary registration server apparatus in FIG. 1.

The temporary registration server apparatus 5 includes a computer. FIG. 5 is a block diagram showing a configuration of a temporary registration server apparatus 5 in FIG. 1. In FIG. 5, CPU 51 is an arithmetic processing apparatus which executes a program, and performs processing described in the program. A ROM 52 is a non-volatile memory in which program and data are stored in advance. A RAM 53 is a memory in which program and data are temporarily stored when the program is executed. A HDD 54 is a hard disk drive apparatus as a storage medium in which an operating system (not shown in FIG. 5) and a program such as a temporary registration processing program 54*a* or the like are stored. A communication apparatus 55 is an apparatus which connects to the network 3, and performs data communication with another apparatus via the network 3. As the communication apparatus 55, for example, a network interface card, a modem, or the like are arbitrarily used.

A communication processing section 51*a* and a temporary registration processing section 51*b* are realized by executing the temporary registration processing program 54*a* by the CPU 51. The communication processing section 51*a* is a processing section which controls the communication apparatus 55 to receive the session information generated by the user management server apparatus 1-*i* from the user terminal apparatus 2-*j*, and transmits the session information and the network address information of the user management server apparatus 1-*i* which has generated the session information to the electronic device 4-*k*. The communication processing section 51*a* is an example of a receiving means and a transmitting means.

The temporary registration processing section 51*b* is a processing section which stores the session information generated in a registration session by the user management server apparatus 1-*i* into a session buffer 61 of a data storage apparatus 56, and provides the session information and the address information on the network 3 of the user management server apparatus 1-*i* which has generated the session information to the communication processing section 51*a* in accordance with a request from the electronic device 4-*k* to be registered in the registration session. The address information on the network 3 of the user management server apparatus 1-*i* may be included in the session information by the user management server apparatus 1-*i* and extracted from the session information. Or it is possible to use a method in which the identification information and the address information of the user management server apparatuses 1-1 to 1-L are associated with each other and stored in the data storage apparatus 56, and the identification information of the user management server apparatus 1-*i* is included in the session information, so that the address information is identified from the identification information in the session information by the temporary registration processing section 51*b*. Or it is possible to use a method in which the user management server apparatus 1-*i* which has issued the session information informs the temporary registration server apparatus 5 of the issued session information, and the temporary registration processing section 51*b* adds the address information of the user management server apparatus 1-*i* which informs of the session information corresponding to the session information from the user terminal apparatus 2-*j* to the session information and transmits the session information to the electronic device 4-*k*.

The data storage apparatus 56 is an apparatus which can store a large amount of data and includes the session buffer 61 which stores data transmitted/received in the temporary registration processing. As such an apparatus, a hard disk drive apparatus, a disk array apparatus, or the like is used.

In the temporary registration server apparatus 5, the CPU 51, the ROM 52, the RAM 53, the HDD 54, the communication apparatus 55, and the data storage apparatus 56 are mutually connected by a bus, controller, and the like to be able to communicate with each other.

Next, when the correspondence relationship between the user and the electronic device has not been registered as the session information, for example, the user management server apparatus 1-*i* receives ID information unique for each type of the electronic device. When the correspondence relationship between the user and the electronic device has been registered, for example, the user management server apparatus 1-*i* receives the device ID 41 and a device authentication key issued when the electronic device is registered.

Figure 6:
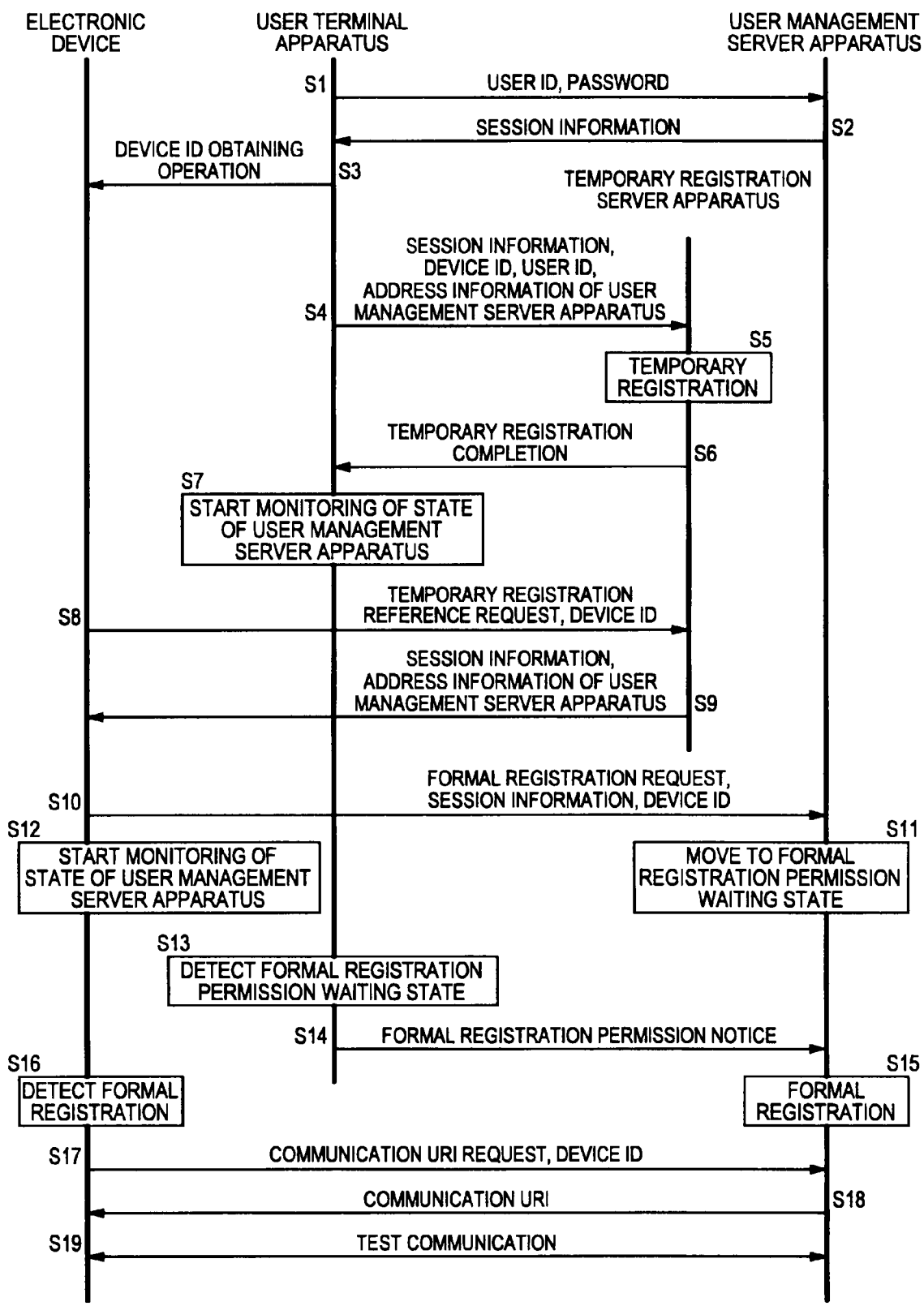
FIG. 6 is a diagram illustrating a registration method of the electronic device to the user management server apparatus in the first embodiment.

Next, FIG. 6 shows an example of the user table 21 and the electronic device table 22. In the user table 21, the user ID and password hash information are associated and stored. Further, the user management server apparatus 1-*i* registers the correspondence relationship between the user and the electronic device by, for example as shown in FIG. 6, associating and recording the device ID and the user ID indicating the user who can operate the device indicated by the device ID in the electronic device table 22.

Next, FIG. 7 is an example of a device registration request table 62 which is temporary table information in which the temporary registration server 5 stores information of the electronic device currently being registered and the user requesting the registration. When the registration of the electronic device is completed, records related to the registration on the device registration request table are deleted.

Next, operations of each apparatus in the above system will be described. FIG. 6 is a diagram illustrating a registration method of the electronic device 4-*k* to the user management server apparatus 1-*i* in the first embodiment.

When a user registers the electronic device 4-*k* to the user management server apparatus 1-*i*, the user operates the input apparatus 31 of the user terminal apparatus 2-*j* to browse a web page of the user management server apparatus 1-*i* in which the user is registered by using an HTTP client such as a web browser, and inputs his or her own user ID and password. The user ID is identification information unique to the user.

The communication processing section 34 of the user terminal apparatus 2-*j* specifies a known URL (Uniform Resource Locator) of the user management server apparatus 1-*i* in accordance with the user operation to the input apparatus 31, downloads a web page from the user management server apparatus 1-*i*, and displays the web page on the display 32. In the web page, there are input fields for the user ID and password, and the user inputs his or her own user ID and password in the fields. The communication processing section 34 transmits the input user ID and password to the user management server apparatus 1-*i* (step S1).

The communication between the user terminal apparatus 2-*j* and the user management server apparatus 1-*i* is performed between the communication processing section 34 and the communication processing section 11*b* via the communication apparatus 33, the network 3, and the communication apparatus 15.

In the user management server apparatus 1-*i*, when the communication processing section 11*b* receives a web page request using HTTP from the user terminal apparatus 2-*j*, the communication processing section 11*b* transmits the web page. Thereafter, when the communication processing section 11*b* receives the user ID and password, the communication processing section 11*b* refers to the user table 21, and determines whether the user is an authenticated user or not based on the user ID and password. When the user is an authenticated user, the communication processing section 11*b* starts a registration session, and transmits the session information generated by the session information generation section 11*a* to the user terminal apparatus 2-*j* (step S2). The session information includes identification information unique to the registration session. When receiving the session information, the communication processing section 34 of the user terminal apparatus 2-*j* temporarily stores the session information in a memory not shown in the figures. The registration processing section 11*c* associates the transmitted session information with the user ID and stores them in the RAM 13 until the registration session is completed. When the user is not an authenticated user, the registration processing is aborted.

The user terminal apparatus 2-*j* obtains the device ID 41 of the electronic device 4-*k* which should be registered in accordance with the user operation to the input apparatus 31. For example, when the device ID 41 is arranged on the housing surface of the electronic device 4-*k* as a two-dimensional code such as a QR code (registered trademark), and the user terminal apparatus 2-*j* includes an image capturing apparatus and a decoder of the two-dimensional code, the device ID 41 may be obtained by capturing the two-dimensional code by the image capturing apparatus and decoding the two-dimensional code by the decoder. Or the user may input the device ID 41 into the input apparatus 31. The device ID 41 of the electronic device 4-*k* obtained in this way is provided to the communication processing section 34 and temporarily stored in a memory not shown in the figures.

Next, the communication processing section 34 of the user terminal apparatus 2-*j* accesses the temporary registration server apparatus 5 based on a known address information on the network 3, and transmits a temporary registration request, the user ID, the address information of the user management server apparatus 1-*i* which is the registration destination, the session information received from the user management server apparatus 1-*i* which is the registration destination, and the device ID 41 of the electronic device 4-*k* which should be registered to the temporary registration server apparatus 5 (step S4).

In the temporary registration server apparatus 5, when the communication processing section 51*a* receives the temporary registration request, the user ID, the session information, and the device ID 41, the temporary registration processing section 51*b* determines whether or not the received device ID 41 is already registered in the session buffer 61. When the device ID 41 is not registered, the temporary registration processing section 51*b* associates the user ID, the session information, and the device ID 41 with each other, stores them in the session buffer 61, performs a temporary registration (step S5), and transmits a temporary registration completion notice to the user terminal apparatus 2-*j* (step S6). On the other hand, when the device ID 41 is already registered, the temporary registration processing section 51*b* may transmit a temporary registration failure notice to the user terminal apparatus 2-*j*, and abort the registration processing.

The communication between the user terminal apparatus 2-*j* and the temporary registration server apparatus 5 is performed between the communication processing section 34 and the communication processing section 51*a* via the communication apparatus 33, the network 3, and the communication apparatus 55.

In the user terminal apparatus 2-*j*, when the communication processing section 34 receives the temporary registration completion notice, the communication processing section 34 performs polling to a predetermined URL on the user management server apparatus 1-*i* and starts a periodical check whether or not the registration session moves to a formal registration permission waiting state (step S7). Specifically, the communication processing section 34 transmits a GET command of HTTP to CGI (Common Gateway Interface) of the predetermined URL, and determines whether or not the registration session moves to the formal registration permission waiting state based on the response to the GET command. The GET command includes the session information or an identifier thereof as an argument. At this time, the registration session has not moved to the formal registration permission waiting state yet.

On the other hand, in the electronic device 4-*k*, when a predetermined user operation to an input apparatus not shown in the figures is detected, the communication processing section 44 accesses the temporary registration server apparatus 5 based on the known address information, and transmits a temporary registration reference request and the device ID 41 of the electronic device 4-*k* (step S8). When the device ID 41 is written in a user manual or the like of the electronic device 4-*k*, the device ID 41 is input to the electronic device 4-*k* by a user operation.

In the temporary registration server apparatus 5, when the communication processing section 51*a* receives the temporary registration reference request and the device ID 41, the temporary registration processing section 51*b* determines whether or not the received device ID 41 is registered in the session buffer 61. When the received device ID 41 is registered in the session buffer 61, the temporary registration processing section 51*b* transmits the session information associated with the device ID 41 and the address information of the user management server apparatus 1-*i* which has issued the session information to the electronic device 4-*k* (step S9).

The communication between the electronic device 4-*k* and the temporary registration server apparatus 5 is performed between the communication processing section 44 and the communication processing section 51*a* via the communication apparatus 43, the network 3, and the communication apparatus 55.

In the electronic device 4-*k*, when receiving the session information and the address information, the communication processing section 44 stores the address information in a memory not shown in the figures. Since the address information is obtained at this time point, the electronic device 4-*k* can communicate with the user management server apparatus 1-*i* which manages the associated user. The communication processing section 44 accesses the user management server apparatus 1-*i* specified by the address information, and transmits a formal registration request, the received session information, and the device ID 41 of the electronic device 4-*k* (step S10).

In the user management server apparatus 1-*i*, when the communication processing section 11*b* receives the formal registration request, the session information, and the device ID 41, the registration processing section 11*c* determines whether or not the same session information in which a registration session has not been completed as the received session information is stored in the RAM 13. When the same session information is stored in the RAM 13, the registration processing section 11c associates the received device ID 41 with the session information in the RAM 13, and stores the received device ID 41. In this way, in the RAM 13, the session information, the user ID, and the device ID 41 are associated with each other. The registration processing section 11c moves the registration session to the formal registration permission waiting state (step S11).

In the electronic device 4-k, after transmitting the formal registration request or the like, the communication processing section 44 performs polling to a predetermined URL on the user management server apparatus 1-i, and starts a periodical check whether or not the formal registration is completed (step S12). Specifically, the communication processing section 44 transmits a GET command of HTTP to CGI of the predetermined URL, and determines whether or not the formal registration is completed based on the response to the GET command. The GET command includes the session information or an identifier thereof as an argument. At this time point, the formal registration is not completed.

On the other hand, since the registration session has moved to the formal registration permission waiting state in the user management server apparatus 1-i, when the communication processing section 34 of the user terminal apparatus 2-j detects the above movement (step S13), the communication processing section 34 causes the display 32 to display an image urging an input for determining whether or not to permit the formal registration. When an operation indicating permission of the formal registration is performed on the input apparatus 31 by the user, the communication processing section 34 transmits a formal registration permission notice to the user management server apparatus 1-i (step S14).

In the user management server apparatus 1-i, when the communication processing section 11b receives the formal registration permission notice, the registration processing section 11c reads the user ID and the device ID 41 associated with the session information corresponding to the formal registration permission notice from the RAM 13, associates them with each other, and registers them in the electronic device table 22. The registration processing section 11c moves the registration session to a formal registration completion state (step S15). The session information, the user ID, and the device ID 41 of the registration session are deleted from the RAM 13 after the formal registration is completed.

Following this, the user management server apparatus 1-i transmits a notice indicating that the formal registration is completed to the user terminal apparatus 2-j as a response to the formal registration permission notice.

On the other hand, since the registration session has moved to the formal registration completion state in the user management server apparatus 1-i, when the communication processing section 44 of the electronic device 4-k detects the above movement (step S16), the communication processing section 44 transmits a communication URI request and the device ID 41 of the electronic device 4-k to the user management server apparatus 1-i (step S17).

In the user management server apparatus 1-i, when receiving the communication URI request and the device ID 41, the communication processing section 11b transmits the communication URI unique to the combination of the user and the device to the electronic device 4-k when the device ID 41 is registered in the electronic device table 22 (step S18). When receiving the communication URI, the communication processing section 44 of the electronic device 4-k stores the communication URI in a memory not shown in the figures, and uses the URI as the address information of the user management server apparatus 1-i in communication after that. In the first embodiment, when receiving the communication URI, the communication processing section 44 performs test communication with the communication processing section 11b of the user management server apparatus 1-i by using a GET command and a POST command of HTTP to the URI (step S19).

As described above, according to the above first embodiment, even when there are a plurality of user management server apparatuses 1-1 to 1-L, and each user management server apparatus 1-i manages different users, the electronic device 4-k can identify the user management server apparatus 1-i of the user who uses the electronic device 4-k from the plurality of user management server apparatuses 1-1 to 1-L, so that an appropriate user management server apparatus 1-i and the electronic device 4-k can be registered to be able to communicate with each other. Even when the user terminal apparatus 2-j does not obtain the address information of the electronic device 4-k on the network 3, the registration can be performed, and even when the electronic device 4-k does not obtain the address information of the user terminal apparatus 2-j on the network 3, the registration can be performed.

Second Embodiment

An electronic device registration system according to a second embodiment of the present invention is a system in which the items described below are added to the system of the first embodiment.

In the second embodiment, the electronic device 4-k stores device use authentication information in a non-volatile memory or the like not shown in the figures in advance, before the transmission of the temporary registration reference request (step S8), determines whether or not the person who performs a user operation is a person permitted to use the electronic device 4-k based on the information input by the user operation to the input apparatus not shown in the figures and the device use authentication information, and transmits the temporary registration reference request only when the person who performs the user operation is a person permitted to use the electronic device 4-k.

Or the temporary registration server apparatus 5 may performs the user authentication. In this case, the temporary registration server apparatus 5 is configured to hold lists of users who can use the electronic device 4-k for each electronic device 4-k in advance, or be able to obtain the lists from an external server. A user identifier input by the user operation is transmitted along with the temporary registration reference request. The temporary registration server apparatus 5 refers to the lists, determines whether or not the person who operates the electronic device 4-k is a user permitted to use the electronic device 4-k based on the user identifier received along with the temporary registration reference request, proceeds to the processing of step S9 only when the request is from a user permitted to use the electronic device 4-k, and does not perform the temporary registration when the request is not from a permitted user.

As described above, according to the second embodiment, it is possible to prevent a third party from illegally registering the electronic device 4-k.

It should be understood by those skilled in the art that various modifications, combinations, sub-combinations and alterations may occur depending on design requirements and other factors insofar as they are within the scope of the appended claims or the equivalents thereof.

For example, in each embodiment described above, the temporary registration server apparatus 5 may permit a plurality of users to temporarily register the same electronic device 4-k. In this case, when referring to the temporary registration, for example, the processing below is performed. In step S8, the electronic device 4-$k$ transmits the user identifier input to the electronic device 4-$k$ by the user operation in addition to the temporary registration reference request and the device ID 41 of the electronic device 4-$k$. In the temporary registration server apparatus 5, when the temporary registration reference request, the device ID 41, and the user identifier are received, it is determined whether or not the device ID 41 and the user identifier are associated with each other and stored in the session buffer 61. When there is a temporary registration of the device ID 41 and the user identifier transmitted along with the temporary registration reference request, in step 9, the session information associated with the device ID 41 and the user identifier, and the address information of the user management server apparatus 1-$i$ which has issued the session information are transmitted to the electronic device 4-$k$.

In each embodiment described above, one of the user management server apparatuses 1-1 to 1-L may be configured to have the function of the temporary registration server apparatus 5.

In each embodiment described above, the user management server apparatus 1-$i$ stores the address information of the temporary registration server apparatus 5 in advance, and the temporary registration request from the user terminal apparatus 2-$j$ to the temporary registration server apparatus 5 in step S4 may be transmitted to the temporary registration server apparatus 5 via the user management server apparatus 1-$i$. In this way, the user terminal apparatus 2-$j$ does not have to know the address of the temporary registration server apparatus 5. The address of the temporary registration server apparatus 5 may be transmitted from the user management server apparatus 1-$i$ to the user terminal apparatus 2-$j$.

In each embodiment described above, the processing from the detection of the formal registration permission waiting state to the formal registration permission notice in steps S13 and S14 may be performed automatically without requesting an operation of the user. Or, when receiving the GET command for monitoring which is started in step S7, the user management server apparatus 1-$i$ may automatically perform the formal registration when the registration session which is being monitored is in the formal registration permission waiting state. In this case, when the formal registration is completed, the user management server apparatus 1-$i$ may transmit a notice indicating that the formal registration is permitted to the user terminal apparatus 2-$j$ as a response to the command.

In each embodiment described above, the device ID 41 is included as an argument in the GET command to the CGI in step S12, and the communication URI may be transmitted as a response to the command when the formal registration is completed. In this way, when the formal registration is completed, the electronic device 4-$k$ can immediately start the test communication.

In each embodiment described above, as the communication URI, a combination of the user and the device or a unique value for each device is not used, but a single value is used, and as an argument used when executing the CGI, a combination of the user and the device or information specifying the device may be specified. As a request to the user management server apparatus 1-$i$ and the temporary registration server apparatus 5, various commands such as GET, POST, and PUT can be used.

In each embodiment described above, an expiration date and time may be set for the communication URI. In this case, when the same combination of the user and the device is used after the expiration date and time, the formal registration is required again.

In each embodiment described above, an expiration date and time may be set for the session information. In this case, when the formal registration is not completed by the expiration date and time, the temporary registration is required again.

The present invention can be applied to a system in which users are managed by a plurality of servers, and an electronic device can be associated with a user.

The present application contains subject matter related to that disclosed in Japanese Priority Patent Application JP 2009-007057 filed in the Japan Patent Office on Jan. 15, 2009, the entire content of which is hereby incorporated by reference.

What is claimed is:

1. An electronic device registration system comprising:
a user management server apparatus configured to:
   transmit session information to a user terminal apparatus in response to receiving user identification information from the user terminal apparatus via a network, wherein the user identification information is input to a web page of the user management server apparatus from the user terminal apparatus;
   in response to receiving electronic device identification information of an electronic device and the session information from the electronic device, move to a registration permission waiting state, wherein the electronic device monitors a state of the user management server apparatus after transmitting the electronic device identification information and the session information;
   register the user identification information and the electronic device in response to reception of a registration permission notice from the user terminal apparatus in an event the user terminal apparatus detects the registration permission waiting state of the user management server apparatus, wherein the electronic device detects the registration of the user identification information and the electronic device and transmits a request for a communication identifier to the user management server apparatus;
   transmit the communication identifier to the electronic device in response to receiving the request for the communication identifier; and
   perform a test communication with the electronic device after transmission of the communication identifier; and
a registration server apparatus configured to:
   which receive address information of the user management server apparatus, the user identification information and the electronic device identification information, along with the session information, from the user terminal apparatus;
   register the user identification information, the session information and the electronic device identification information and transmit a registration completion notification to the user terminal apparatus in an event the electronic device identification information is not registered by the registration server apparatus; and
   transmit the session information and the address information of the user management server apparatus to the electronic device in response to a reception of the electronic device identification information from the electronic device in an event a predetermined user operation is detected at the electronic device, wherein the user management server apparatus receives the electronic device identification information of the electronic device in response to reception of the session information and the address information by the electronic device from the registration server apparatus.

2. The electronic device registration system according to claim 1, wherein the user management server apparatus registers the received user identification information and the electronic device when the received user identification information corresponds with user identification information managed by the user management server apparatus.

3. A user management server apparatus comprising:
one or more processors operable to:
transmit session information to a user terminal apparatus in response to receiving user identification information from the user terminal apparatus via a network, wherein the user identification information is input to a web page of the user management server apparatus from the user terminal apparatus;
in response to receiving electronic device identification information of an electronic device and the session information from the electronic device move to a registration permission waiting state, wherein the electronic device monitors a state of the user management server apparatus after transmitting the electronic device identification information and the session information;
register the user identification information and the electronic device in response to reception of a registration permission notice from the user terminal apparatus in an event the user terminal apparatus detects the registration permission waiting state of the user management server apparatus, wherein the electronic device detects the registration of the user identification information and the electronic device and transmits a request for a communication identifier to the user management server apparatus;
transmit the communication identifier to the electronic device in response to receiving the request for the communication identifier;
perform a test communication with the electronic device after transmission of the communication identifier; and
receive the electronic device identification information of the electronic device in response to reception of the session information and the address information by the electronic device from a registration server apparatus in an event a predetermined user operation is detected at the electronic device.

4. A registration server apparatus comprising:
one or more processors operable to:
receive address information of a user management server apparatus, user identification information and electronic device identification information of an electronic device, along with session information, from a user terminal apparatus, wherein the user identification information is input to a web page of the user management server apparatus from the user terminal apparatus;
register the user identification information, the session information and the electronic device identification information and transmit a registration completion notification to the user terminal apparatus in an event the electronic device identification information is not registered by the registration server apparatus; and transmit the session information and the address information of the user management server apparatus to the electronic device in response to a reception of the electronic device identification information from the electronic device in an event a predetermined user operation is detected at the electronic device, wherein the user management server apparatus receives the electronic device identification information of the electronic device in response to reception of the session information and the address information by the electronic device from the registration server apparatus.

5. The registration server apparatus according to claim 4, wherein a registration completion notice is transmitted to the user terminal apparatus in response to receiving the electronic device identification information and the session information from the user terminal apparatus.

6. An electronic device registration method, comprising:
in a user management server apparatus:
transmitting session information to a user terminal apparatus in response to receiving user identification information from the user terminal apparatus via a network, wherein the user identification information is input to a web page of the user management server apparatus from the user terminal apparatus;
in response to receiving electronic device identification information of an electronic device and the session information from the electronic device, moving to a registration permission waiting state, wherein the electronic device monitors a state of the user management server apparatus after transmitting the electronic device identification information and the session information;
registering the user identification information and the electronic device in response to reception of a registration permission notice from the user terminal apparatus in an event the user terminal apparatus detects the registration permission waiting state of the user management server apparatus, wherein the electronic device detects the registration of the user identification information and the electronic device and transmits a request for a communication identifier to the user management server apparatus;
transmitting the communication identifier to the electronic device in response to receiving the request for the communication identifier; and
performing a test communication with the electronic device; and
in a registration server apparatus:
receiving address information of the user management server apparatus, the user identification information and the electronic device identification information, along with the session information, from the user terminal apparatus,
registering the user identification information, the session information and the electronic device identification information and transmitting a registration completion notification to the user terminal apparatus in an event the electronic device identification information is not registered by the registration server apparatus; and
transmitting the session information and the address information of the user management server apparatus to the electronic device in response to a reception of the electronic device identification information from the electronic device in an event a predetermined user operation is detected at the electronic device, wherein the user management server apparatus receives the electronic device identification information of the electronic device in response to reception of the session information and the address information by the electronic device from the registration server apparatus.

\* \* \* \* \*